Oct. 1, 1957 W. A. ESCHENBURG ET AL 2,808,084
ADJUSTABLE GUIDE FENCE FOR POWER TOOL WORK TABLE
Filed Dec. 13, 1954 2 Sheets-Sheet 1
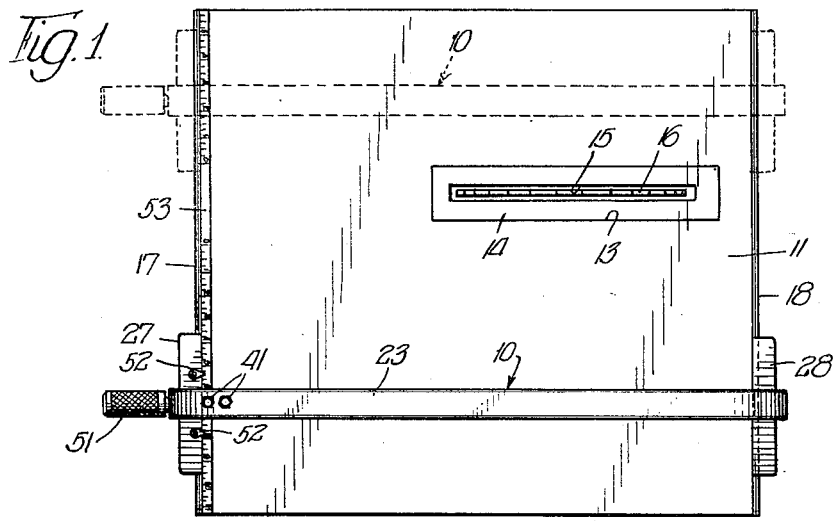
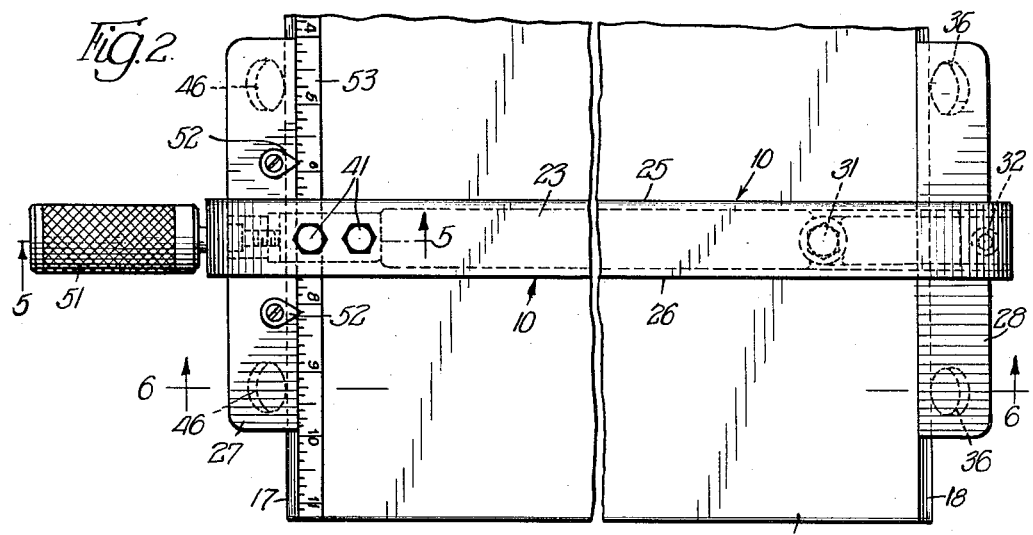
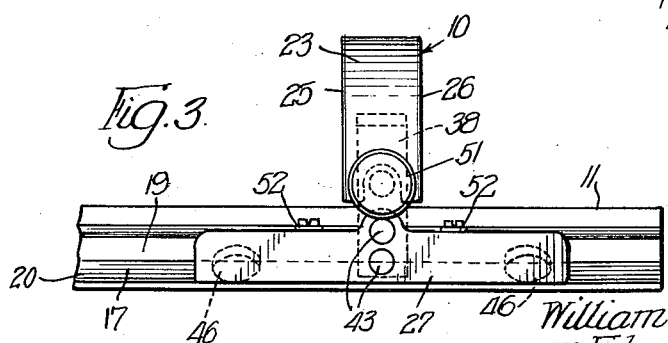
INVENTORS.
William A. Eschenburg,
BY Edward Balstad,
Cromwell, Greist & Warden
Attys Oct. 1, 1957 W. A. ESCHENBURG ET AL 2,808,084
ADJUSTABLE GUIDE FENCE FOR POWER TOOL WORK TABLE
Filed Dec. 13, 1954 2 Sheets-Sheet 2
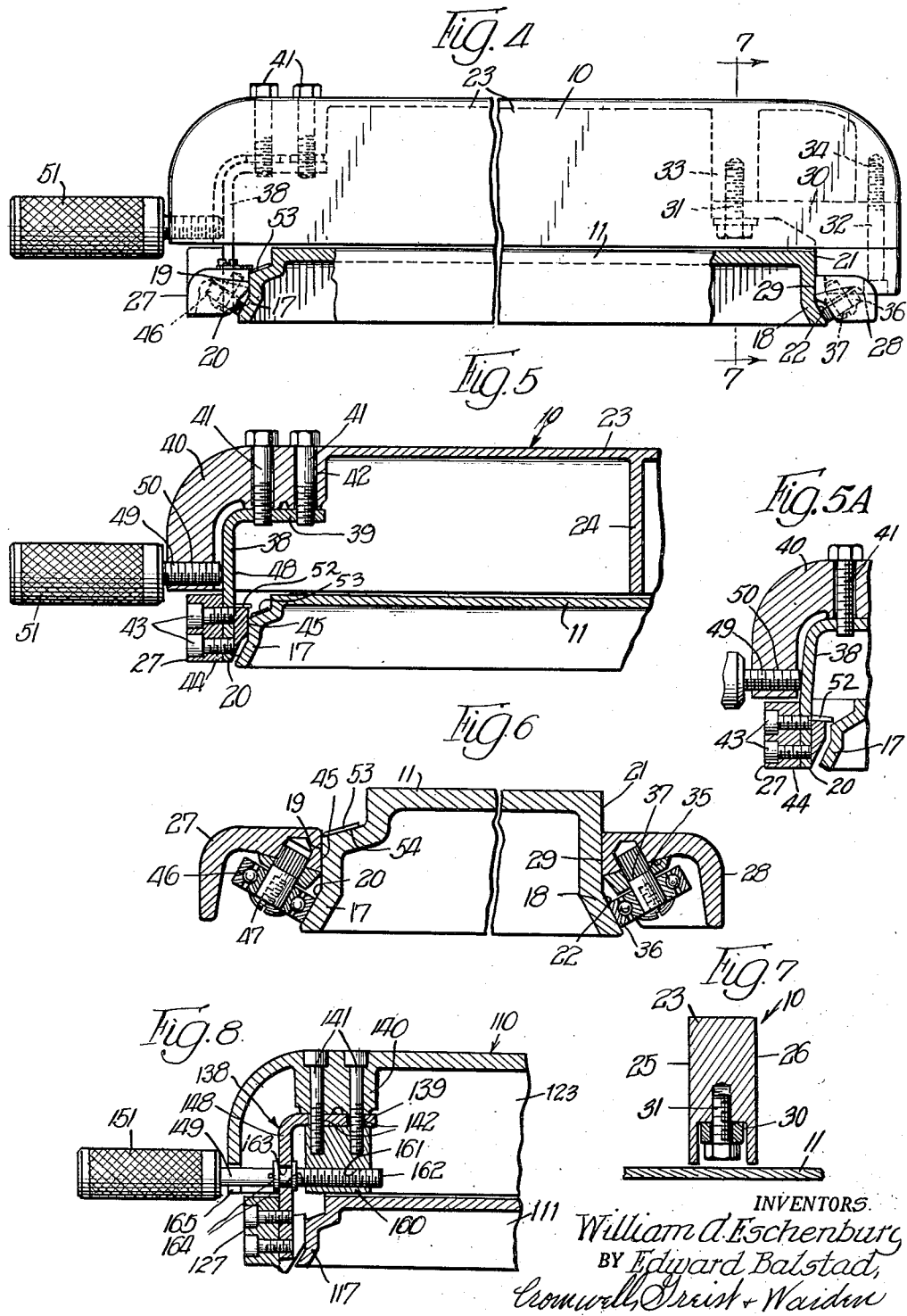

United States Patent Office 2,808,084
Patented Oct. 1, 1957

2,808,084

ADJUSTABLE GUIDE FENCE FOR POWER TOOL WORK TABLE

William A. Eschenburg, South Beloit, Ill., and Edward Balstad, Beloit, Wis., assignors to Yates-American Machine Company, Beloit, Wis., a corporation of Delaware Application December 13, 1954, Serial No. 474,662

10 Claims. (Cl. 143—174)

This invention relates to power tools of the type in which a cutting tool is mounted in a slot in a work table and the work is moved against the cutting tool along the surface of the table, and is particularly concerned with improvements in a guide fence for guiding the work in a predetermined path relative to the cutting tool.

It is a general object of the invention to provide a guide fence for use on the work table of a mechanically driven tool such as a power saw or the like, and cooperating elements on the work table and the fence for supporting the fence so that it may be readily positioned on the table in the desired location relative to the cutting tool.

It is a more specific object of the invention to provide a work fence for the table of a power driven tool and cooperating members for supporting the ends of the fence on the edges of the table and for clamping the same in rigid relation thereon when the working face of the fence is located at the desired distance from the cutting tool.

It is a still more specific object of the invention to provide a guide fence for the work table of a power driven tool and cooperating mechanism for supporting the fence in readily movable relation on the table which comprises supporting rail formations along the front and rear edges of the table, clamping members depending from the ends of the fence which are adapted to grip the rail formations to rigidly secure the fence in position on the table and anti-friction elements mounted on the fence and engaging with the rail formations for supporting the fence thereon and permitting it to be moved along the table to position the same at the desired distance from the tool.

It is another object of the invention to provide a work guiding fence for use on the work table of a mechanically driven tool wherein the work table is characterized by parallel front and rear edges having elongate rail formations thereon with outwardly facing surfaces which are angularly related and wherein the fence is provided at its ends with downwardly extending clamp plates which are adapted to be engaged in clamping relation with one of the outwardly facing surface portions of the rail forming edges on the table and wherein anti-friction bearing members are mounted on the ends of the fence for engaging in fence supporting relation with the other outwardly facing surface portions of the rail forming edges on the table.

It is a further object of the invention to provide a work guiding fence for application to a work table having parallel front and rear edges with outwardly facing substantially vertical portions and outwardly inclined portions, which fence is characterized by a work guiding bar which is adapted to be positioned over the table at right angles to the front and rear edges of the latter, and front and rear blocks beneath the front and rear ends of the bar to which the latter is secured, the front and rear blocks being adapted to be positioned in front of and behind the front and rear edges, respectively, of the table for coaction with said edges, the blocks having means for clamping engagement with the vertical portions of the edges and means for supporting engagement with the inclined portions of the edges and means being provided for moving one of the blocks toward and away from the other block.

These and other objects and advantages of the invention will be apparent from a consideration of the apparatus which is shown by way of illustration in the accompanying drawings, wherein:

Fig. 1 is a plan view of a saw table top having mounted thereupon a guide fence which embodies therein the principal features of the invention;

Fig. 2 is a plan view to an enlarged scale and with portions broken away of the guide fence and the work table top;

Fig. 3 is a front elevation of the guide fence and portions of the table shown in Fig. 2;

Fig. 4 is a side elevation of the guide fence and table with portions broken away;

Fig. 5 is a fragmentary section taken on the line 5—5 of Fig. 2;

Fig. 5A is a fragmentary cross section similar to Fig. 5 with the front clamping block in retracted non-clamping position;

Fig. 6 is a section taken on the line 6—6 of Fig. 2 with portions broken away;

Fig. 7 is a section taken on the line 7—7 of Fig. 4; and

Fig. 8 is a section similar to Fig. 5 illustrating a modified form of the guide fence.

Referring to the drawings, there is illustrated a guide fence or rip gauge 10 mounted on the top of the work table 11 of a power driven circular saw, which incorporates therein the principal features of the invention. It will be understood, of course, that the invention may be incorporated in a guide fence and work table for any similar tool where it is desirable to be able to accurately adjust the position of the fence relative to the path of movement of the cutting edge or surface of the tool so that the tool may be operated with maximum efficiency and maximum safety to the operator.

The table 11 is supported on a conventional base (not shown) and is generally rectangular in shape with a transversely extending blade receiving aperture 13 having an insert or cover 14 which is slotted at 15 to receive the saw blade 16, the latter being mounted on an arbor mechanism (not shown) and having associated therewith conventional mechanism whereby it may be raised and lowered and tilted in the usual manner.

The table 11 is provided with a peripheral flange formation which extends downwardly from the working surface of the table and which includes guide rail formations 17 and 18 formed along the front and rear edges thereof. The guide rail formations 17 and 18 which are parallel to each other are constructed so that they provide a support for the ends of the fence 10 and they also cooperate with elements on the fence for clamping the same in rigid relation thereon. The forward table flange or edge formation 17 is formed with a longitudinally and vertically extending surface portion 19 intermediate its top and bottom edges and an outwardly and downwardly inclined longitudinally extending surface portion 20 extending along the bottom or terminal edge thereof. The rear flange formation 18 is formed in a similar manner with an upper longitudinally extending vertical face or surface 21 and a lower longitudinally extending outwardly and downwardly sloping surface 22.

The fence 10 comprises a work guiding bar or rail section 23 which extends across the top of the table 11. The bar section 23 is somewhat longer than the width of the table 11 and is of inverted U-shaped or channel-shaped cross section with longitudinally spaced reinforcing cross webs 24. The opposite side faces 25 and 26 are accurately machined so that they are in parallel planes. The fence is positioned with the open side against the surface of the table 11 and with the side faces 25 and 26 perpendicular thereto so that it may be used on either side of the saw blade 16 as indicated in Fig. 1.

The ends of the fence 10 extend beyond the front and rear side edges 17 and 18 of the table 11 and support in depending relation thereon clamping and supporting blocks or bracket members 27 and 28. The clamping block 28 at the rear end of the fence 10, which extends along the rear edge 18 of the table 11 below the working surface thereof when the fence is in use, is generally T-shaped wtih the cross head being angular in cross section and with the forward edge or face 29 in a generally vertical plane and in confronting relation with the vertical face 21 of the rear table edge 18. The stem portion 30 of the block 28 extends upwardly intermediate the ends of its top surface forming an upstanding rib-like portion which projects into the interior of the rear end of the fence 10 and is secured in fixed relation therein by the attaching bolts 31 and 32, the former extending in screw threaded relation into an aperture in a cross web portion 33 and the latter extending in screw threaded relation into an aperture in the end wall portion 34 of the fence 10. The clamping block 28 carries on its downwardly facing inner surface 35 a pair of supporting rollers 36 which are mounted on spaced pins 37 arranged at the proper angle to engage the rollers 36 with the downwardly inclined surface 22 on the rear edge 18 of the table 11. The rollers 36 normally support the rear end of the fence 10 on the inclined track formation with the surfaces 21 and 29 separated sufficiently to permit free rolling movement thereof.

At the forward end of the fence 10 the clamping block 27 is connected to the fence by an angular bracket member 38. The bracket 38 is positioned with one leg 39 extending horizontally within the downwardly opening side of the fence 10 and is secured to the front end portion 40 of the fence by means of a pair of bolts 41. Bolts 41 are positioned vertically in holes 42 which are somewhat larger in diameter than the bolts 41 and their ends are in threaded engagement in apertures provided in the horizontal leg 39 of the bracket 38. The clearance between the holes 42 and the bolts 41 is sufficient to permit some adjustment of the fence to bring the working faces 25 and 26 into parallelism relative to the plane of operation of the saw blade 16. The bracket 38 is connected at its lower end to the clamping block 27 by a pair of bolts 43 which extend through a central web portion 44 of the clamping block 27. The clamping block 27 extends along the forward or front edge 17 of the table 11 and is angular in section with the rearwardly facing vertical edge 45 in confronting relation with the vertical portion 19 of the edge 17. The clamping block 27 carries a pair of spaced anti-friction rollers 46 which are mounted on supporting pins 47. The pins 47 extend at a downward and outward angle so that the rollers 46 are in engagement with the tapered or sloping surface 20 of the table edge 17. The supporting bracket 38 is formed of material with sufficient resiliency to permit the vertical leg 48 to be moved or swung about the horizontal leg 39 to bring the surface 45 of the clamping block 27 into clamping engagement with the vertical surface 19 of the table edge 17 by means of an operating screw 49 which extends through a threaded aperture 50 in the forward end wall of the bar section 23 of the fence 10. The screw 49 is provided with a knurled head 51 to facilitate manual operation of the same and its inner end engages with the spring-like vertical leg 48 of the bracket 38. The bracket 38 is mounted so that in its normal position the end supporting rollers 46 and 36 will ride on the sloping track formations 20 and 22 with the bar section 23 of the fence 10 spaced slightly above the top surface of the table 11. In this position the fence 10 is free to slide or move toward and from the saw blade 16. Upon taking up on the screw 49 and thus applying a pressure to the vertical arm 48 of the bracket 38 the clamping blocks 27 and 28 are moved relative to the edges 17 and 18 of the table 11 to bring the clamping faces 29 and 45 into engagement with the vertical surfaces 19 and 20 of the table edges (Figs. 5 and 6), the rollers riding upwardly on the sloping surfaces or tracks 20 and 22 as the arm 48 of the bracket 38 is moved inwardly toward the table, so that the clamping faces are brought into engagement at both front and rear edges of the table. When the screw 49 is retracted (Fig. 5A) the leg 48 of the spring bracket 38 moves outwardly and away from the table edge and allows the rollers 36 and 46 to drop to their normal position in engagement with the sloping edges of the table and the fence is free to move relative to the table top for the proper or desired adjustment.

The front clamping block 27 carries on its upper surface a pair of pointers 52, arranged on opposite sides of the bar 23, and a scale 53 is mounted on a forwardly and downwardly sloping shelf 54 which extends along the front edge of the table 11 above the clamping surface 19 so that the fence 10 may be moved a measured distance when desired.

In using the fence it may be quickly and easily positioned on the table top by merely arranging the bar portion 23 crosswise of the table as illustrated in Fig. 1 and placing the rollers 36 and 46 in engagement with the sloping surfaces on the front and rear edges of the table. Any initial adjustment of the bar portion 23 of the fence to bring the working surfaces 25 and 26 into parallelism with the plane of operation of the blade 16 may be initially made by loosening the connecting bolts 41 and retightening the same after the bar portion of the fence 23 has been brought into the proper position, relative to the plane of the blade 16. Thereafter, all that is required to clamp the mechanism in rigid relation on the table top when it has been adjusted manually to the desired position, is to take upon the screw 50 by turning the knob 51 until the clamping blocks 27 and 28 engage with the edges of the table and lock the same in position. Retracting the screw 50 releases the fence 10 from clamped relation with the table 11 and permits its removal in a vertical direction if desired.

A modified form of the clamping arrangement at the front end of the fence is shown in Fig. 8. In this form of the device fence 110 is modified slightly at the forward end while the table structure 111 is the same as table 11 in Figs. 1 to 7. The front clamping block 127 is identical with the clamping block 27 and is secured to the vertical leg 148 of a supporting bracket 138 which is provided with a horizontal leg 139 having apertures 142 through which a pair of securing bolts 141 extend with their ends in threaded engagement in apertures provided in a block member 160 which clamps the leg 139 between its upper surface and the lower surface of a cross web portion 140 within the work guiding bar section 123. The block member 160 is provided with a horizontally extending threaded aperture 161 which receives the threaded end 162 of an adjusting screw or bolt 149. The adjusting screw 149 extends through an aperture 163 in the vertical leg 148 of the bracket 138 and is held in rotatable engagement therewith by a pair of collar members 164 which are secured on the stem of the screw 149 so that when the screw 149 is manually turned the arm 148 of the bracket 138 is swung toward or from the front edge 117 of the table 111. With this arrangement the arm 148 of the bracket 138 is moved in both directions by positive rotation of the screw 149. The block member 160 acts as an anchor for the screw 149 and also for securing the bracket 138 to the end of the bar section 123 of the fence. The apertures 142 in the horizontal arm 139 of the bracket 138 are of somewhat larger diameter than the diameter of the bolts 141 to permit adjustment for bringing the working faces of the fence 110 into parallelism with the tool on the table 111. The front wall of the bar section 123 is notched at 165 to permit the adjusting screw 149 to extend forwardly of the same and the screw 149 is provided with an operating knob 151. The operation of the fence 110 on the table 111 is the same as described in connection with the fence 10 and the table 11, all other parts of the fence and the table being identical with the form illustrated in Figs. 1 to 7 inclusive.

While specific details of construction have been referred to in describing the illustrated forms of the invention, it will be understood that other details of construction may be resorted to within the spirit of the invention.

We claim:

1. In a mechanically driven tool having a work receiving table, a work guiding fence of inverted U-shaped cross section adapted to be positioned on said work table with its open face downward, fence supporting rail formations at opposite edges of the table, T-shaped clamp members on the ends of said fence having their head portions depending along the outer faces of the edges of the table, means resiliently mounting one of said clamp members on said fence and means for forcing said resiliently mounted clamp member toward the adjacent table edge to rigidly clamp the ends of said fence to said rail formations, said rail formations having an upwardly facing track portion and said clamp members having anti-friction rollers mounted thereon in position to engage with said track portions to support said fence in free rolling relation thereon when said clamp members are in non-clamping position.

2. A work guiding fence for use on a work table of a power tool or the like, said work table having parallel front and rear flanges each provided with an outwardly facing portion of the surface thereof sloping downwardly away from the top of the table and an adjacent surface portion thereof extending substantially normal to the top of the table, said fence comprising a work guiding portion adapted to extend across the top of the table and front and rear end supporting portions extending adjacent the outside faces of said flanges, anti-friction bearings on said end supporting portions engageable with the sloping surface portions on said flanges to support the fence in free sliding relation thereon, front and rear clamping blocks on said end supporting portions and a screw member extending through the front end supporting portion and engaging the front clamping block for moving said front clamping block inwardly of the end of said fence and to frictionally engage both front and rear clamping blocks with said flanges and thereby rigidly secure said fence on the top of said work table.

3. A work guiding fence for use on a work table of a power tool or the like, said work table having parallel front and rear flanges each provided with an outwardly facing portion of the surface thereof sloping away from the top of the table and an adjacent surface portion thereof extending substantially vertical, said fence comprising a work guiding portion adapted to extend across the top of the table and supporting blocks on the ends thereof having clamping portions confronting the vertical surface portions of said flanges, anti-friction bearings on said supporting blocks engageable with the sloping surface portions on said flanges to support said fence in free sliding relation thereon, a resilient angle member having its legs connected to the fence and the front supporting block respectively and a screw extending through the front end of said fence and engaging said angle member for moving said front supporting block inwardly of the front end of said fence to frictionally clamp said flanges between said clamping blocks and thereby rigidly secure said fence on the top of said work table.

4. A work guiding fence for use on a work table of a power tool or the like, said work table having parallel front and rear flanges each provided with an outwardly facing portion of the surface thereof sloping away from the top of the table and an adjacent surface portion thereof extending substantially vertical, said fence comprising a work guiding portion adapted to extend across the top of the table and end supporting blocks extending adjacent the outside faces of said flanges, anti-friction bearings on said end supporting blocks engageable with the sloping surface portions on said flanges to support said fence in free sliding relation thereon, an angle bracket having a resilient vertically positioned leg secured to the front end supporting block and a horizontally positioned leg secured between a cross web at the front end of the fence and a clamping member beneath the cross web, and a screw extending through the vertically positioned leg and into the clamping member for adjusting the position of the front end supporting block relative to said fence to frictionally clamp said table flanges between said end supporting blocks and thereby rigidly secure said fence on the top of said work table.

5. A fence for application to a table provided with parallel front and rear edges having depending substantially vertical portions and outwardly and downwardly inclined portions below said vertical portions, which fence is characterized by a work guiding bar which is adapted to be positioned over the table at right angles to the front and rear edges of the latter, and front and rear blocks movably secured beneath the front and rear ends of the bar, said front and rear blocks being adapted to be positioned in front of and behind the front and rear edges respectively of the table for coaction with said edges, said blocks having vertical portions for clamping engagement with the vertical portions of said edges and inwardly and downwardly inclined anti-friction members for supporting engagement with the inclined portions of said edges, and means for moving one of said blocks inwardly of the end of the bar to engage the vertical portions of said table edges in clamping relation between the vertical portions of said blocks.

6. A guide fence for a power tool work table wherein the work table is characterized by parallel front and rear side edge formations which include angularly related rail forming surfaces, one of said surfaces being generally vertical and the other of said surfaces sloping downwardly and outwardly away from the top surface of the table, said guide fence having a work guiding body portion adapted to extend across the work table and end portions adapted to be supported on said table edge formations, end support brackets on said end portions having vertical clamp forming surfaces in confronting relation with said vertical rail surfaces, and said end support brackets having anti-friction rollers riding on the sloping rail surfaces and a manually operated clamping member extending between the front end portion of the fence and the front end support bracket for moving the same in the direction of the table edge to frictionally engage the end support brackets in clamping relation with said vertical rail surfaces.

7. In a mechanically driven tool having a work receiving table, a work guiding fence adapted to be adjustably positioned on said work table, parallel outwardly extending fence supporting rail formations adjacent opposite edges of the table and beneath the work surface thereof, cooperating clamp plates mounted in depending inwardly movable relation on opposite ends of said fence, and means for moving said clamp plates to position the inner portions thereof in rigid clamping relation against said rail formations with the fence extending across the work table, said rail formations each having an upwardly facing portion forming a track thereon and anti-friction rollers mounted on the ends of said fence in downwardly directed relation for engaging said track portions whereby to support said fence in free rolling relation on said track portions when said clamp plates are in non-clamping position relative to said rail formations.

8. A fence for application to a table provided with parallel front and rear edges having substantially vertical portions and outwardly and downwardly inclined portions, which fence is characterized by a work guiding cross rail which is adapted to be positioned over the table at right angles to the front and rear edges of the latter and front and rear blocks depending beneath the front and rear ends of the rail to which the latter is secured, said blocks being adapted to be positioned in front of and behind the front and rear edges respectively of the table for coaction with said edges, said blocks having vertical portions positioned for clamping engagement with the vertical portions of said edges, anti-friction means mounted on said blocks and extending diagonally inwardly thereof for rolling engagement with the inclined portions of said edges and manually operable means connecting one of said blocks with said rail for moving said blocks toward each other whereby to clamp the fence to the edges of the table.

9. In a mechanically driven tool having a work receiving table, a work guiding fence adapted to be positioned on said work table, fence supporting rail formations at opposite edges of the table, T-shaped clamp members on the ends of said fence having their head portions depending along the outer edges of the table, a resilient member mounting one of said clamp members on said fence and means to force said resiliently mounted clamp member toward the adjacent table edge to rigidly clamp the ends of said fence to said rail formations, said rail formations having an upwardly facing track portion and said clamp members having anti-friction members mounted thereon to engage in rolling relation with said upwardly facing track portions to support said fence in free rolling relation thereon when said clamp members are in non-clamping position.

10. In a mechanically driven tool having a work receiving table, a work guiding fence adapted to be positioned on said work table, fence supporting rail formations at opposite front and rear edges of the table, T-shaped clamp members at the ends of said fence having their head portions depending along the outer edges of the table, a resilient member depending from said fence and supporting the front one of said T-shaped clamp members, means extending between the fence and the front clamp member for forcing the latter toward the front rail formation to rigidly clamp the ends of said fence to said rail formations, said rail formations having an upwardly and outwardly facing track portion and said clamp members having spaced anti-friction rollers on the head portion thereof positioned to engage with said upwardly and outwardly facing track portion to support said fence in free rolling relation thereon when said clamp members are in non-clamping position.

References Cited in the file of this patent

UNITED STATES PATENTS

| | | |
|---|---|---|
| 2,265,335 | Aumann | Dec. 9, 1941 |
| 2,312,356 | Ocenasek | Mar. 2, 1943 |
| 2,548,279 | Young | Apr. 10, 1951 |

FOREIGN PATENTS

| | | |
|---|---|---|
| 65,034 | Denmark | Nov. 11, 1946 |
| 947,006 | France | Jan. 3, 1949 |